A. E. SMITH.
Carriage Spring.
No. 94,981. Patented Sept. 21, 1869.
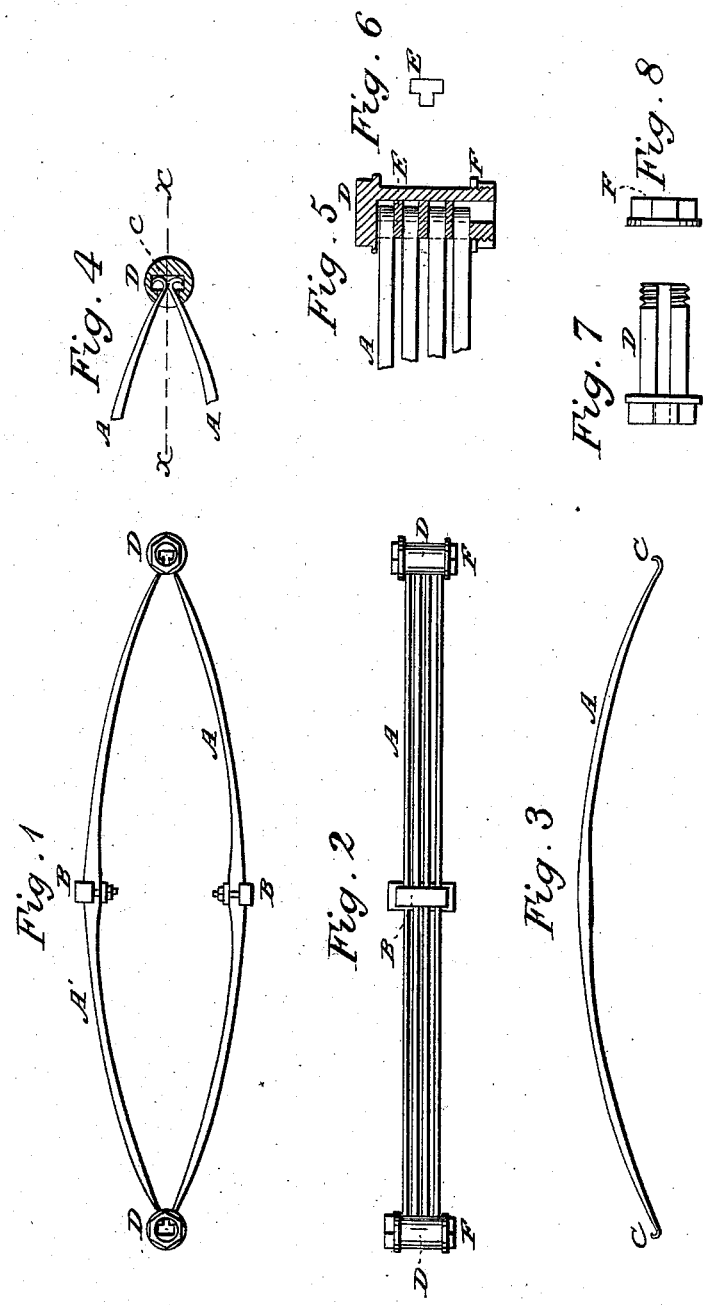

United States Patent Office.

ALFRED E. SMITH, OF BRONXVILLE, NEW YORK.

Letters Patent No. 94,981, dated September 21, 1869; antedated September 15, 1869.

IMPROVED CARRIAGE-SPRING.

The Schedule referred to in these Letters Patent and making part of the same.

*To all whom it may concern:*

Be it known that I, ALFRED E. SMITH, of Bronxville, Westchester county, and State of New York, have invented certain new and useful Improvements in the Manufacture of Elliptic Springs for Vehicles, and other purposes; and I do hereby declare that the following is a full description of the same.

The nature of my invention consists—

First, in the method of locking the ends of elliptic springs together by means of a slotted bolt, whereby the ends of the springs may have a small amount of endwise motion, to respond to their compression, and thus overcome the objection to hinged eyes and bolts, commonly used for uniting together the upper and lower halves of elliptic springs.

Second, in forming an elliptic spring, by combining together duplicate series of opposing and parallel ribs of metal, in contradistinction to flattened plates of metal, commonly used for making elliptic springs.

But to describe my invention more particularly, I will refer to the accompanying drawings, forming a part of this specification, the same letters of reference, wherever they occur, referring to like parts.

Figure 1 is a side view of the spring.

Figure 2 is a plan view of the same.

Figure 3 is a detached view of one of the metal ribs.

Figure 4 is a sectional view of the ends of the ribs, showing the mode of locking them into the slotted bolt.

Figure 5 is a sectional view of the ends of the ribs and slotted bolt, through the line $x\ x$, fig. 4, showing the metal washers for separating the ends of the ribs from each other.

Figure 6 is a detached view of a metal washer.

Figures 7 and 8 are representations of the slotted bolt and nut.

Letter A represents a series of bows or ribs of spring steel, bent or curved so as to act as an elliptic spring, and formed of any length, and depth, or strength of metal desired.

As a rule, I propose to make each of the ribs about an inch wide, and proportion their depths according to their lengths, and the load they are intended to support.

For the purpose of increasing the power of the spring, several ribs will be combined together, in a parallel row, by means of a metal clip, B, in which are arranged studs or partitions, for separating the ribs, one from the other, and thus obtain the advantages of a broad spring, without the use of the same quantity of metal. These clips are intended also to answer the purpose of holding the spring to the axle-tree and body of the vehicle, in the usual way of attaching elliptic springs to vehicles.

For the purpose of combining the upper and lower, or opposing series of ribs together, so as to form an elliptic spring, the ends of the ribs are bent, or rolled back and upward, as shown at $c$, figs. 3 and 4, and inserted into a T-shaped slot, cut longitudinally in the bolt D.

To keep the ends of the ribs spread out or separated from each other, T-shaped metal washers are interposed between them, as seen at letter E, figs, 5 and 6. It will thus be seen that the upper and lower series of ribs oppose each other, and when the nut F is secured on the end of the slotted bolt, the ribs and washers are firmly bound together, laterally, while, owing to the conformation of the interior of the slot in the bolt, and the disconnected ends of the ribs from the bolt, allow of them to have an endwise motion, so as to avoid all possible risk of breaking the joint.

By the ordinary way of bolting the upper and lower leaves of flat elliptic springs together, the eye, formed in their ends, makes a rigid and unyielding joint. The consequence of this is the frequent wearing and breaking out of the eye in the thin ends of the leaves of the springs.

In my way of securing the elliptic springs together at their ends, there is no eye or hinge formed on the ends of the leaves or ribs, as may be the case when applied to either kinds of springs. The ends are simply bent up, so as to prevent getting out of the slot in the bolt, while the entire wear and strain is developed against the end of the spring on the interior opening of the bolt. It will be obvious from this, that by no possible means can the springs break at the joint, as with the common way of hinging the upper and lower leaves of elliptic springs, and at the same time that elliptic springs, made in the manner hereinbefore described, can be made cheaper than by the old way.

Having now described my improvements in the method of making elliptic springs for vehicles of various kinds, and other purposes, I will proceed to set forth what I claim, and desire to secure by Letters Patent of the United States.

1. I claim the combination of the bolt D, having a T or similar shaped longitudinal slot in it, with the ribs of a skeleton, or leaves of a flat elliptic spring, as a means of locking their ends together, substantially as hereinbefore described.

2. Also, the combination of upper and lower parallel rows of independent and opposing ribs or strips of metal A, with the clip B, and washers E, arranged and operating substantially as hereinbefore set forth.

ALFRED E. SMITH.

Witnesses:
CHARLES L. BARRITT,
FRANKLIN BARRITT.